United States Patent [19]

Mashiki

[11] Patent Number: 5,848,580
[45] Date of Patent: Dec. 15, 1998

[54] APPARATUS AND METHOD FOR CONTROLLING FUEL INJECTION IN INTERNAL COMBUSTION ENGINE

[75] Inventor: Zenichiro Mashiki, Toyota, Japan

[73] Assignee: Toyota Jidosha Kabushiki Kaisha, Toyota, Japan

[21] Appl. No.: 992,110

[22] Filed: Dec. 17, 1997

[30] Foreign Application Priority Data

Dec. 19, 1996 [JP] Japan .................................. 8-339781

[51] Int. Cl.$^6$ .................................................. F02D 41/40
[52] U.S. Cl. ........................ 123/295; 123/698; 123/480
[58] Field of Search .................................... 123/478, 480, 123/571, 698, 295

[56] References Cited

U.S. PATENT DOCUMENTS

| | | | |
|---|---|---|---|
| 4,155,332 | 5/1979 | Yaegashi et al. | 123/480 |
| 4,332,226 | 6/1982 | Nomura et al. | 123/494 |
| 4,553,518 | 11/1985 | Takao et al. | 123/478 |
| 4,599,694 | 7/1986 | Aposchanski et al. | 364/431.05 |
| 4,664,090 | 5/1987 | Kabasin | 123/478 |
| 5,002,031 | 3/1991 | Kako | 123/571 |

FOREIGN PATENT DOCUMENTS

A 7-19083   1/1995   Japan .
A 7-301139  11/1995  Japan .

*Primary Examiner*—Erick R. Solis
*Attorney, Agent, or Firm*—Oliff & Berridge, PLC

[57] ABSTRACT

An improved apparatus and method for controlling fuel injection in an internal combustion engine. An EGR passage is connected to an intake duct for supplying exhaust gas, which has been discharged from a combustion chamber, to the intake duct. An EGR valve is located in the EGR passage to adjust the flow rate of the exhaust gas supplied to the intake duct from the EGR passage. An acceleration pedal adjusts the flow rate of the air supplied to the combustion chamber. An ECU computes the amount of fuel to be injected from a fuel injection valve based on the depression degree of the acceleration pedal and the engine speed when the exhaust gas is supplied to the intake duct from the EGR passage. The ECU computes the amount of fuel to be injected from the fuel injection valve based on the intake pressure and the engine speed when the exhaust gas is not supplied to the intake duct from the EGR passage. The ECU controls the fuel injection valve based on the computed fuel injection amount. This prevents intake air fluctuations caused by exhaust gas recirculation from affecting the computed fuel injection amount.

15 Claims, 4 Drawing Sheets

APPARATUS AND METHOD FOR CONTROLLING FUEL INJECTION IN INTERNAL COMBUSTION ENGINE

BACKGROUND OF THE INVENTION

The present invention relates to an apparatus and method for controlling the fuel injection in internal combustion engines. More particularly, the present invention pertains to apparatuses and methods for controlling the fuel injection in internal combustion engines having an exhaust recirculation mechanism, which recirculates some of the exhaust gas.

In a typical engine, fuel is injected into an intake port from a fuel injection valve to charge a uniform mixture of fuel and air to the associated combustion chamber. An intake passage is opened and closed by a throttle valve, which is operated by manipulating an acceleration pedal. The opening of the throttle valve adjusts the intake air amount (and ultimately the amount of homogeneously mixed air and fuel) that is supplied to the combustion chambers of the engine. This controls engine power.

However, when performing homogeneous charge combustion, vacuum is produced by the throttling action of the throttle valve. The throttling increases energy loss due to pumping, which results when the mixture is drawn into the combustion chamber from the intake port. To attempt to solve this problem, stratified charge combustion has been proposed. In stratified charge combustion, the throttle valve is opened wide and fuel is supplied directly into each combustion chamber when the engine load is small. This provides a mixture having a relatively low air-fuel ratio in the vicinity of the ignition plug. As a result, the mixture is easier to ignite. The stratified charge combustion improves the fuel economy of the engine and decreases the energy loss of pumping.

Japanese Unexamined Patent Application No. 7-301139 describes an engine that performs stratified charge combustion. In this engine, fuel is directly injected into combustion chambers. The amount of intake air is predicted based on the acceleration pedal depression degree (the opening amount of the throttle valve) and the engine speed. The amount of fuel injection is computed in accordance with the predicted intake air amount. The actual amount of the intake air is computed based on a detection result of an intake pressure sensor. The amount of fuel injection, which is computed based on the predicted intake air amount, is adjusted in accordance with the computed intake air amount.

If provided with an exhaust gas recirculation (EGR) mechanism, which recirculates some of exhaust gas discharged from combustion chambers to an intake path, the engine of the above publication has the following problems. In general, when stratified charge combustion is performed, the amount of recirculated exhaust gas (EGR amount) is increased for reducing the exhaust emission of NOx and for improving the fuel economy. However, an increased EGR amount increases fluctuation of intake pressure in the intake path. In this case, an accurate intake air amount cannot be obtained based on the intake pressure detected by the intake pressure sensor. Thus, the amount of fuel injection is not accurately adjusted. This degrades the acceleration response of the engine.

SUMMARY OF THE INVENTION

Accordingly, it is an objective of the present invention to provide an apparatus and method for controlling the fuel injection amount in an internal combustion engine so that the proper amount of fuel is always injected.

To achieve the above objective, the present invention provides an apparatus for controlling fuel injection in an internal combustion engine that burns air-fuel mixture in a combustion chamber. The apparatus has an injector for injecting fuel to supply the fuel into the combustion chamber. An intake passage is connected to the combustion chamber for supplying air to the combustion chamber. A circulation passage is connected to the intake passage for supplying exhaust gas, which has been discharged from the combustion chamber, to the intake passage. A circulation valve is located in the circulation passage. The circulation valve controls the opening amount of the circulation passage to adjust the flow rate of the exhaust gas supplied to the intake passage from the circulation passage. An air regulator adjusts the flow rate of air supplied to the combustion chamber from the intake passage. A first detector detects the operation state of the air regulator. The operation state of the air regulator serves as a first variable. A second detector detects a characteristic of air in the intake passage that is indicative of the flow rate of the air in the intake passage. The detected characteristic serves as a second variable. A controller controls the injector. The controller computes the amount of fuel to be injected from the injector based on a plurality of parameters that indicate the operation state of the engine. The controller selects one of the first variable and the second variable to use as one of the plurality of parameters depending on the flow rate of the exhaust gas supplied to the intake passage from the circulation passage.

The present invention further provides a method for controlling fuel injection in an internal combustion engine. The method comprises the steps of injecting fuel into a combustion chamber of the engine with an injector; supplying air to the combustion chamber via an intake passage; regulating the flow rate of the intake air with an air regulator; supplying exhaust gas to the intake passage via a circulation passage; detecting the operation state of the air regulator, wherein the operation state of the air regulator serves as a first variable; detecting a characteristic of air in the intake passage, wherein the characteristic is indicative of the flow rate of the air in the intake passage, wherein the detected characteristic serves as a second variable; computing an amount of fuel to be injected from the injector based on a plurality of parameters that indicate the operation state of the engine, wherein the computing step includes a step of selecting one of the first variable and the second variable to use as one of the plurality of parameters depending on the flow rate of the exhaust gas supplied to the intake passage from the circulation passage; and controlling the injector based on the computed fuel injection amount.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

One embodiment of an apparatus and method for controlling fuel injection amount in an internal combustion engine according to the present invention will now be described with reference to the drawings.

Figure 1:
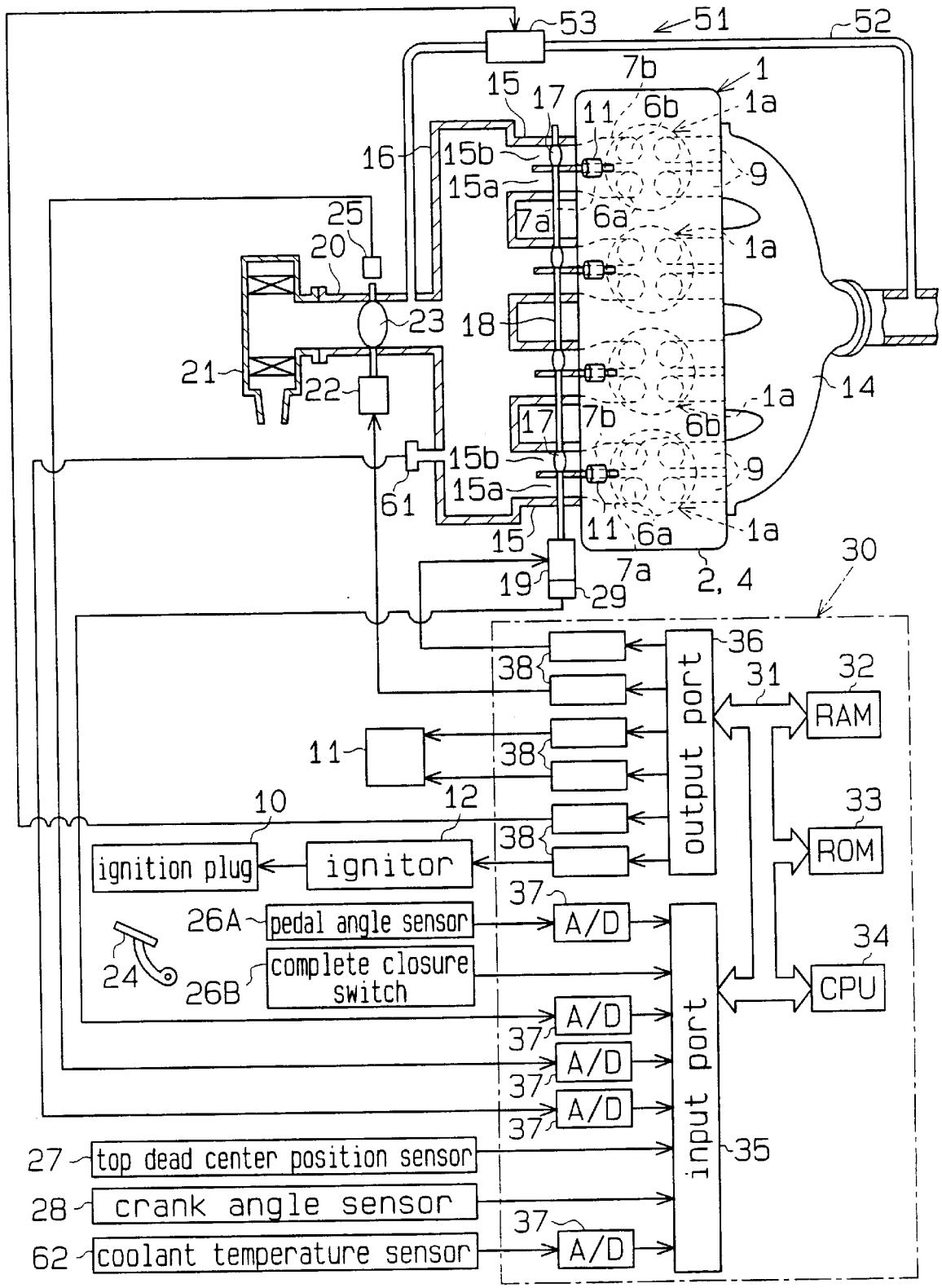
FIG. 1 is a diagrammatic drawing showing an apparatus for controlling fuel injection amount in an engine according to a preferred embodiment of the present invention.
Figure 2:
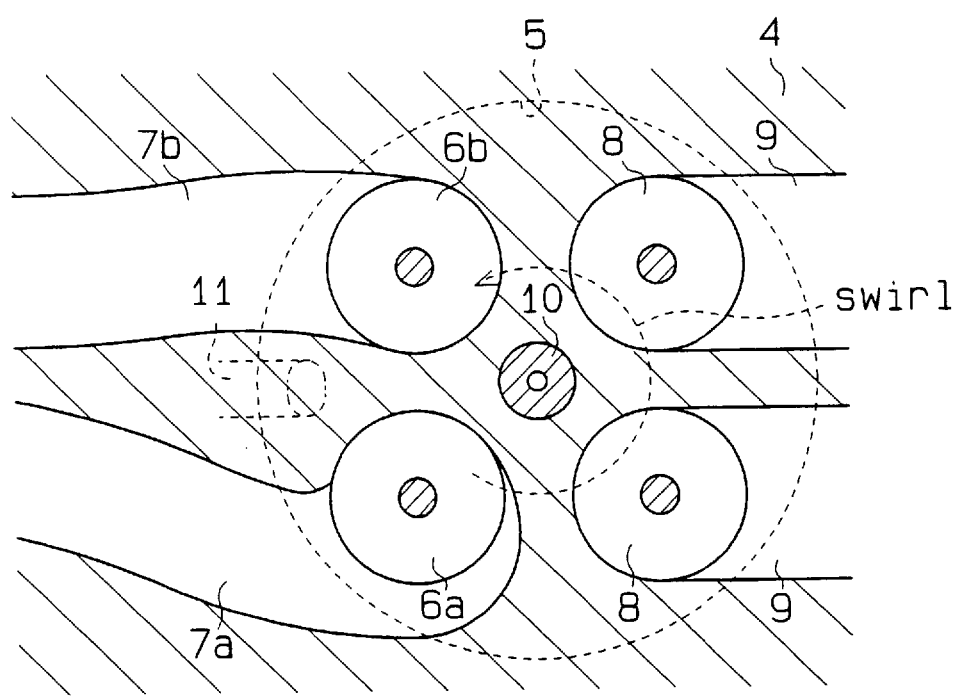
FIG. 2 is an enlarged diagrammatic cross-sectional view showing an engine cylinder.

FIG. 1 is a diagram showing an apparatus for controlling fuel injection amount in a cylinder injection type engine employed in a vehicle. As shown in FIG. 1, an engine 1 is provided with four cylinders 1a. The structure of the combustion chamber of each cylinder 1a is shown in FIG. 2. The engine 1 has a cylinder block 2 that accommodates pistons. The pistons are reciprocated in the cylinders 1a of the cylinder block 2. A cylinder head 4 is arranged on top of the cylinder block 2. A combustion chamber 5 is defined between each piston and the cylinder head 4. Four valves are provided for each cylinder 1a. The four valves include a first intake valve 6a, a second intake valve 6b, and two exhaust valves 8. The first intake valve 6a is located in a first intake port 7a while the second intake valve 6b is located in a second intake port 7b. Each exhaust valve 8 is located in an exhaust port 9.

As shown in FIG. 2, the first intake port 7a is a curved port that extends in a helical manner. The second port 7b extends in a generally straight manner. Ignition plugs 10 are arranged at the middle of the cylinder head 4 to face the combustion chambers 5. High voltage is applied to each ignition plug 10 by an ignitor 12 through a distributor (not shown). The ignition timing of the ignition plugs 10 is determined by the output timing of the high voltage sent from the ignitor 12. A fuel injection valve 11 is arranged near the inner wall of the cylinder head 4 in the vicinity of each set of first and second intake valves 6a, 6b in each combustion chamber 5. The fuel injection valve 11 injects fuel directly into the associated combustion chamber 5 of cylinder 1a.

In this embodiment, each injection valve 11 directly injects fuel into the combustion chamber 5 of the associated cylinder 1a when either stratified charge combustion or homogeneous charge combustion is performed. When stratified charge combustion is performed, the valve 11 injects fuel into the combustion chamber 5 at the final stage of each compression stroke. The injected fuel is supplied in a concentrated manner about the ignition plug 10 and burned. When homogeneous charge combustion is performed, on the other hand, the valve 11 injects fuel into the combustion chamber 5 during the intake stroke of the associated piston. The injected fuel is homogeneously mixed with air introduced into the combustion chamber 5 from the intake ports 7a, 7b and is burned.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve (SCV) 17 is arranged in each second intake passage 15b. The swirl control valves 17 are connected to, for example, a step motor 19 by a common shaft 18. The step motor 19 is controlled by signals sent from an electronic control unit (ECU) 30, which will be discussed later, and changes the opening of the SCV 17.

The surge tank 16 is connected to an air cleaner 21 through an intake duct 20. An electronically controlled throttle valve 23, which is opened and closed by a step motor 22, is arranged in the intake duct 20. The ECU 30 sends signals to drive the step motor 22 for opening and closing the throttle valve 23. The throttle valve 23 adjusts the amount of intake air that passes through the intake duct 20 and enters the combustion chambers 5. The intake duct 20, the surge tank 16, the first intake passage 15a and the second intake pipe 15b constitute an intake path. A throttle sensor 25 is arranged in the vicinity of the throttle valve 23 to detect the opening amount (throttle opening amount) of the valve 23. The sensor 25 detects the actuation state of the throttle valve 23.

The exhaust ports 9 of each cylinder 1a are connected to an exhaust manifold 14. After combustion in each combustion chamber 5, the exhaust gas is sent to an exhaust duct (not shown) through the exhaust manifold 14. The exhaust manifold 14 and the exhaust duct constitute an exhaust path.

The engine 1 is provided with a conventional exhaust gas recirculation (EGR) mechanism 51 that includes an EGR passage 52 and an EGR valve 53 arranged in the EGR passage 52. The EGR passage 52 communicates a part of the intake duct 20 at the downstream side of the throttle valve 23 with the exhaust duct. The EGR valve 53 includes a valve seat, a valve body, and a step motor (none of which is not shown). The opening area of the EGR valve 53 is altered by causing the step motor to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The EGR valve 53 controls the recirculation amount of the exhaust gas.

The ECU 30 is a digital computer provided with a random access memory (RAM) 32, a read only memory (ROM) 33, a central processing unit (CPU) 34, which is a microprocessor, an input port 35 and an output port 36. A bidirectional bus 31 connects the RAM 32, the ROM 33, the CPU 34, the input port 35, and the output port 36 to one another.

An acceleration pedal 24 is connected to a pedal angle sensor 26A. The pedal angle sensor 26A generates voltage proportional to the degree of depression of the acceleration pedal 24. Thus, the acceleration pedal depression degree ACCP, which is proportional to the load applied to the engine 1, to be detected. The voltage output by the pedal angle sensor 26A is input into the CPU 30 by way of an analog-to-digital (A/D) converter 37 and the input port 35. The pedal angle sensor 24 functions as a device for controlling the amount of intake air through the intake path. The acceleration pedal 24 is also provided with a complete closure switch 26B, which detects whether the acceleration pedal 24 is not pressed at all. The closure switch 26B outputs a signal of one when the acceleration pedal 24 is not pressed at all and outputs a signal of zero when the acceleration pedal 24 is pressed. The output voltage of the closure switch 26B is input to the CPU 34 via the input port 35.

A top dead center position sensor 27 generates an output pulse when, for example, the piston in the first cylinder 1a reaches the top dead center position. The output pulse is input into the CPU 34 via the input port 35. A crank angle sensor 28 generates an output pulse each time a crankshaft of the engine 1 is rotated, for example, by a crank angle CA of 30 degrees. The output pulse sent from the crank angle sensor 28 is input into the CPU 34 via the input port 35. The CPU 34 reads the output pulses of the top dead center position sensor 27 and the crank angle sensor 28 to compute the engine speed NE.

The rotational angle of the shaft 18 is detected by a swirl control valve sensor 29 to measure the opening amount of the swirl control valves 17 (SCV opening amount). The signal output of the swirl control valve sensor 29 is input into the CPU 34 via an A/D converter 37 and the input port 35. The throttle sensor 25 detects the throttle opening amount. The signal output of the throttle sensor 25 is input to the CPU 34 via an A/D converter 37 and the input port 35.

An intake pressure sensor 61 is provided to detect the pressure in the surge tank 16 (intake pressure PIM). A coolant temperature sensor 62 is provided to detect the temperature of the engine coolant (coolant temperature THW). The sensors 61 and 62 output signals based on detected values to the CPU 34 by way of corresponding A/D converters 37 and the input port 35.

The throttle sensor 25, the pedal angle sensor 26A, the complete closure switch 26B, the top dead center position sensor 27, the crank angle sensor 28, the swirl control valve sensor 29, the intake pressure sensor 61 and the coolant temperature sensor 62 serve as devices for detecting the running state of the engine 1.

The output port 36 is connected to the fuel injection valves 11, the step motors 19, 22, the ignitor 12, and the step motor of the EGR valve 53 by way of drive circuits 38. The ECU 30 optimally controls the fuel injection valves 11, the step motors 19, 22, the ignitor 12 and the EGR valve 53 with control programs stored in the ROM 33 based on signals sent from the sensors 25–29, 61 and 62.

Figure 3:
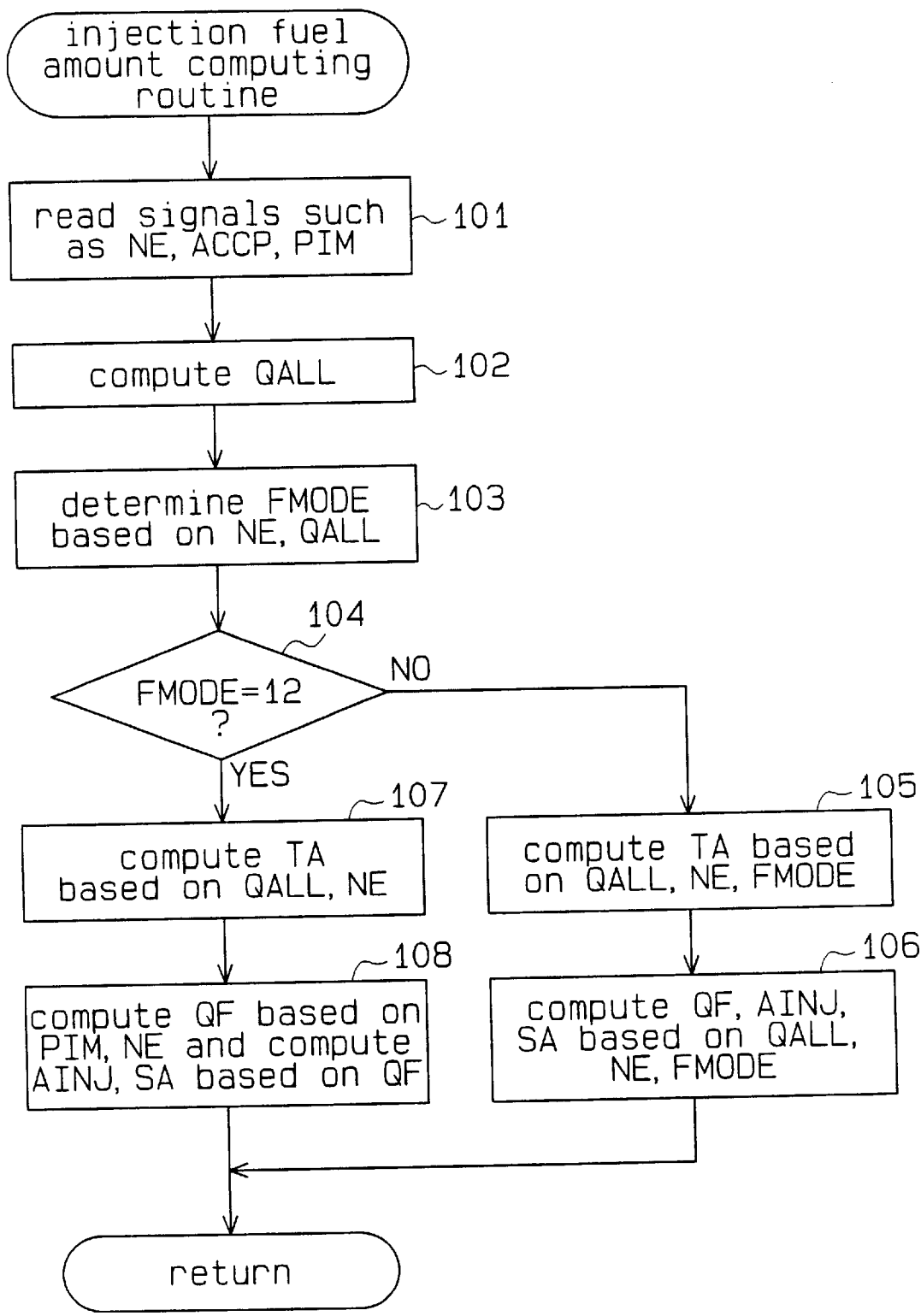
FIG. 3 is a flowchart illustrating a routing for computing the fuel injection amount executed by an ECU.

Control programs performed by the injection amount controlling apparatus of the above described engine 1 will hereafter be described with reference to flowcharts. FIG. 3 is a flowchart showing a routine for computing fuel injection amount. This routine is an interrupt executed by the ECU 30 at every predetermined crank angle.

At step 101, the ECU 30 inputs signals from the top dead center position sensor 27, the crank angle sensor 28, the pedal angle sensor 26A and the intake pressure sensor 61. Based on the input signals, the ECU 30 computes the engine speed NE, the acceleration pedal depression degree ACCP and the intake pressure PIM.

At step 102, the ECU 30 computes a basic fuel injection amount QALL based on the engine speed NE and the acceleration pedal depression degree ACCP, which are computed at step 101 of the current routine. The value of QALL is proportional to and is thus representative of the torque of the engine 1. When computing QALL, the ECU 30 uses a map (not shown) in which the value of QALL is plotted in relation to the engine speed NE and the acceleration pedal depression degree ACCP.

At step 103, the ECU 30 determines the combustion mode FMODE of the engine 1 based on the engine speed NE and the basic fuel injection amount QALL, which are computed at step 102 of the current routine. When determining FMODE, the ECU 30 refers to the map of FIG. 4. When the engine speed NE is low and the engine torque is small, the ECU 30 selects stratified charge combustion, which is indicated by an area of FIG. 4 bounded by the solid line curve and the axes. When the engine speed NE is high and the engine torque is great, the ECU 30 selects homogeneous charge combustion. The entire stratified charge combustion mode region and a part of the homogeneous charge combustion region are included in an EGR-on mode region, which is diagonally shaded in the graph of FIG. 4. The part of the homogeneous region included in the EGR-on region is a part that corresponds to lower engine speeds and lower engine torques. On the other hand, most of the homogeneous charge combustion region, which are not shaded in the graph, is included in an EGR-off mode (FMODE 12) region. When the EGR-on mode is selected, the EGR valve 53 is opened, that is an EGR control is performed. Contrarily, when the EGR-off mode is selected (FMODE=12), the EGR valve 53 is fully closed and the EGR amount is zero.

At the subsequent step 104, the ECU 30 judges whether the combustion mode FMODE, which is determined at step 103 of the current routine, is 12. In other words, the ECU 30 judges whether EGR control is being executed. If the combustion mode FMODE is not 12, the EGR control is currently being executed. When EGR control is being executed, the ECU 30 judges that the intake pressure in the intake path is very likely to be fluctuating because of the recirculation of exhaust gas. Thus, the ECU 30 moves to step 105. At step 105, the ECU 30 computes a target throttle opening amount TA based on the basic fuel injection amount QALL, the engine speed NE and the combustion mode FMODE, which are obtained in the current routine.

At the subsequent step 106, the ECU 30 computes a final fuel injection amount QF based on the basic fuel injection amount QALL, the engine speed NE and the current combustion mode FMODE. The ECU 30 also computes a target injection timing AINJ and a target ignition timing SA based on QALL, NE and FMODE. The ECU 30 then temporarily suspends the routine.

When the EGR control is being executed, it is probable that the pressure in the intake path is fluctuating because of the recirculated exhaust gas. In this case, the final fuel injection amount QF is computed based on the engine speed NE and the basic fuel injection amount QALL, which is computed based on the acceleration pedal depression degree ACCP and the engine speed NE. In other words, the depression degree ACCP and the engine speed NE are used as parameters for computing the final fuel injection amount QF. The ECU 30 uses the computed final fuel injection amount QF in another routine for controlling the fuel injection amount.

If the current combustion mode FMODE is 12 at step 104, the EGR control is not being executed. In this case, the ECU 30 judges that the pressure in the intake path is not fluctuating and moves to step 107. At step 107, the ECU 30 computes a target throttle opening amount TA based on the basic fuel injection amount QALL and the engine speed NE, which are computed in the current routine.

At the subsequent step 108, the ECU 30 computes a final fuel injection amount QF based on the intake pressure PIM and the engine speed NE, which are sensed in the current routine. Also, the ECU 30 computes the target injection timing AINJ and the target ignition timing SA based on the computed final fuel injection amount QF. The ECU 30 then suspends the routine.

In this manner, when the EGR control is not being executed, the pressure in the intake path is not judged to be fluctuating. In this case, the final fuel injection amount QF is computed using the intake pressure PIM, which corresponds to the actual intake air amount, as a parameter. The ECU 30 uses the computed final fuel injection amount QF in another routine for controlling the fuel injection amount.

The operation and advantages will now be explained.

When the EGR control is executed, recirculated exhaust gas may fluctuate the pressure in the intake system. Therefore, when there is a possibility of pressure fluctuation, the acceleration pedal depression degree ACCP and the engine speed NE are used for computing the final fuel injection amount QF, and the intake pressure PIM is not used. That is, the intake air amount is not judged based on the intake pressure PIM but is judged based on the acceleration pedal depression degree ACCP detected by the acceleration pedal sensor 26A (in other words, the actuation state of the acceleration pedal 24, which controls the intake air amount) and the engine speed NE. The resulting intake air amount is used for computing the final fuel injection amount QF. Therefore, the value of the final fuel injection amount QF is not affected by intake pressure fluctuation caused by exhaust gas recirculation.

Since exhaust gas is not recirculated to the intake system when the EGR control is not executed, the pressure in the intake system does not fluctuate. In this embodiment, different sets of parameters are used for computing the final fuel injection amount QF when the there is pressure fluctuation from when there is no pressure fluctuation. That is, when there is no pressure fluctuation in the intake system, the intake pressure PIM, which corresponds to the actual intake air amount, is used as a parameter for computing the final fuel injection amount QF. Since the detected intake pressure PIM is free of pressure fluctuations, an accurate value of the intake air amount is obtained based on PIM. The final fuel injection amount QF is thus accurately computed.

In this manner, the final fuel injection amount QF is always accurately computed regardless whether the EGR control is being executed or not. This improves the response of the engine 1 when the vehicle is accelerating.

When the EGR control is being executed, the ECU 30 controls the EGR valve 53 to increase the EGR amount when the load on the engine 1 decreases. The load on the engine 1 corresponds to the engine speed NE and the acceleration pedal depression degree ACCP. In other words, the engine load corresponds to the basic fuel injection amount QALL, which is computed based on the engine speed NE and the acceleration pedal depression degree ACCP. The smaller the engine load is, that is, the smaller the value of the basic fuel injection amount QALL is, the greater the EGR amount becomes. A greater EGR amount reduces the exhaust emission of NOx and improves the fuel economy. When the engine load is great, the EGR amount is decreased or zero. This allows the engine 1 to increase the power in response to the increased engine load. In this manner, the EGR amount is controlled in accordance with the engine load.

Figure 4:
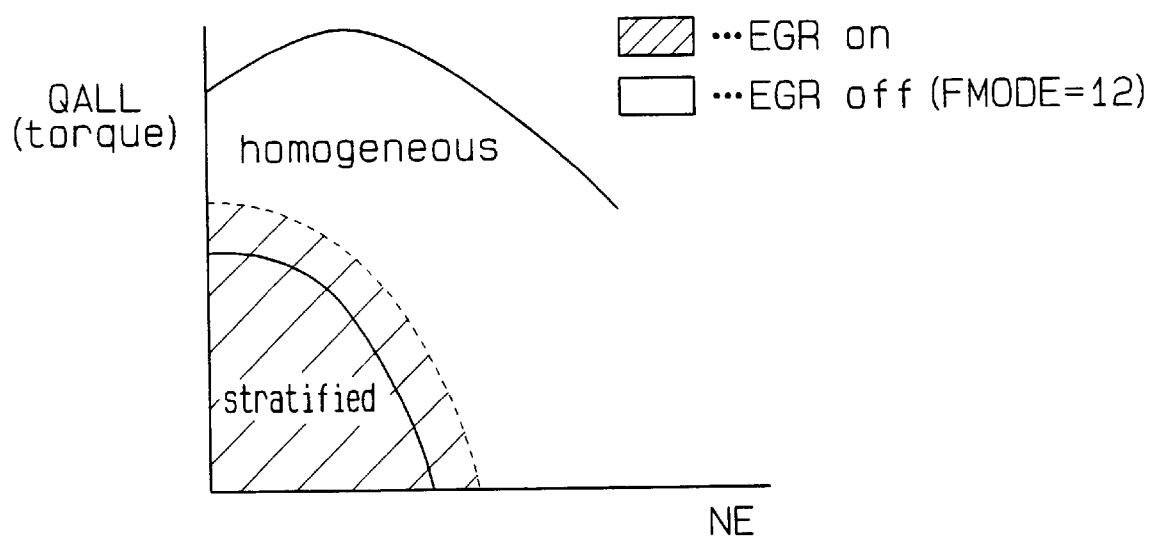
FIG. 4 is a graph for determining combustion mode of the engine based on the relationship between the engine speed and basic fuel injection amount.

As shown in the map of FIG. 4, the amount of EGR and the determination of whether to execute the EGR control are closely related to the combustion mode FMODE, which is determined based on the engine load. Therefore, not only the current engine load, but also the current combustion mode is reflected on the computed EGR amount.

When stratified charge combustion is performed, the EGR amount is increased. Accordingly, the exhaust emission of NOx is reduced and the fuel economy is improved. At this time, the acceleration pedal depression degree ACCP and the engine speed NE are used as parameters for computing the final fuel injection amount QF. However, the intake pressure PIM is not used as one of the parameters. Therefore, the final fuel injection amount QF is accurately computed without being affected by EGR related pressure fluctuation in the intake system.

When the EGR control is executed, the final fuel injection amount QF is computed based on data including the detection result of the pedal angle sensor 26 (the acceleration pedal depression degree ACCP). Therefore, the intake air amount is indirectly and easily detected based on data including the pedal angle ACCP, and pressure fluctuations in the intake system have little or no effect on the detected intake air amount.

It should be apparent to those skilled in the art that the present invention may be embodied in many other specific forms without departing from the spirit or scope of the invention. Particularly, it should be understood that the invention may be embodied in the following forms.

In the illustrated embodiment, the intake pressure PIM is used as one of the parameters for computing the final fuel injection amount QF. However, as illustrated by a two-dot chain line in FIG. 5, an air flow meter 50 may be located in the intake system and, instead of PIM, the intake air amount detected by the air flow meter may be used as a parameter for computing QF. This construction allows the intake air amount to be directly detected.

In the illustrated embodiment, steps 107 and 108 are executed only when the EGR amount is zero. However, the steps may be executed when the EGR amount is small if the pressure fluctuation in the intake system is not considered to be significant.

In the illustrated embodiment, the acceleration pedal depression degree ACCP is used for computing both of the basic fuel injection amount QALL and the final fuel injection amount QF. However, instead of ACCP, the opening amount of the throttle valve 23, which is detected by the throttle sensor 25, may be used for computing the basic fuel injection amount QALL and the final fuel injection amount QF.

A mechanical throttle valve that is linked to an acceleration pedal may be used in lieu of the electronically controlled throttle valve 23.

In the illustrated embodiment, the present invention is applied to the cylinder injection type engine 1. However, the present invention may be applied to an engine that injects fuel beneath the intake valves 6a, 6b provided in the associated intake ports 7a, 7b. Further, in the illustrated embodiment, the fuel injection valve 11 is provided in the vicinity of the intake valves 6a, 6b. However, the valve 11 may be located at any position.

The present invention may be embodied in an engine that does not perform stratified charge combustion.

The illustrated embodiment is employed in a gasoline engine 1. However the present invention may be embodied in a diesel engine.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling fuel injection in an internal combustion engine that burns air-fuel mixture in a combustion chamber, the apparatus comprising:

an injector for injecting fuel to supply the fuel into the combustion chamber;

an intake passage connected to the combustion chamber for supplying air to the combustion chamber;

a circulation passage connected to the intake passage for supplying exhaust gas, which has been discharged from the combustion chamber, to the intake passage;

a circulation valve located in the circulation passage, wherein the circulation valve controls the opening amount of the circulation passage to adjust the flow rate of the exhaust gas supplied to the intake passage from the circulation passage;

an air regulator for adjusting the flow rate of air supplied to the combustion chamber from the intake passage;

a first detector for detecting the operation state of the air regulator, wherein the operation state of the air regulator serves as a first variable;

a second detector for detecting a characteristic of air in the intake passage that is indicative of the flow rate of the air in the intake passage, wherein the detected characteristic serves as a second variable; and a controller for controlling the injector, wherein the controller computes the amount of fuel to be injected from the injector based on a plurality of parameters that indicate the operation state of the engine, and wherein the controller selects one of the first variable and the second variable to use as one of the plurality of parameters depending on the flow rate of the exhaust gas supplied to the intake passage from the circulation passage;

wherein the engine is able to perform a plurality of combustion modes, wherein the controller selects a required combustion mode from the plurality of combustion modes in accordance with the engine load and controls the injector according to the selected combustion mode;

wherein the combustion modes include stratified charge combustion, in which the air-fuel ratio varies within the combustion chamber, and homogeneous charge combustion, in which the air-fuel mixture is substantially homogeneous within the combustion chamber; and wherein the injector includes a fuel injection valve for directly injecting fuel into the combustion chamber, wherein the controller controls the fuel injection valve to directly inject fuel into the combustion chamber during a compression stroke of the engine for performing the stratified charge combustion, and wherein the controller controls the fuel injection valve to directly inject fuel into the combustion chamber during an intake stroke of the engine for performing the homogeneous charge combustion.

2. The apparatus according to claim 1, wherein the controller selects the first variable to use as one of the plurality of parameters when the flow rate of the exhaust gas supplied to the intake passage from the circulation passage is above a predetermined value, and wherein the controller selects the second variable to use as one of the plurality of parameters when the flow rate of the exhaust gas supplied to the intake passage from the circulation passage is under the predetermined value.

3. The apparatus according to claim 1, wherein the controller selects the first variable to use as one of the plurality of parameters when exhaust gas is supplied to the intake passage from the circulation passage, and wherein the controller selects the second variable to use as one of the plurality of parameters when no exhaust gas is supplied to the intake passage from the circulation passage.

4. The apparatus according to claim 1 further comprising a third detector for detecting the engine speed, wherein the engine speed detected by the third detector is included in the plurality of parameters.

5. The apparatus according to claim 1, wherein the controller controls the circulation valve to change the flow rate of the exhaust gas supplied to the intake passage from the circulation passage in accordance with the engine load.

6. The apparatus according to claim 5, wherein the engine load is indicated by at least the value of the first variable.

7. The apparatus according to claim 1, wherein the air regulator includes an acceleration pedal, and wherein the first detector is a pedal angle sensor for detecting the depression degree of the acceleration pedal.

8. The apparatus according to claim 1, wherein the air regulator includes a throttle valve located in the intake passage, and wherein the first detector is a throttle sensor for detecting the opening angle of the throttle valve.

9. The apparatus according to claim 1, wherein the second detector is an intake pressure sensor for detecting the pressure in the intake passage.

10. The apparatus according to claim 1, wherein the flow rate of the exhaust gas supplied to the intake passage from the circulation passage is determined in accordance with the combustion mode selected by the controller.

11. An apparatus for controlling fuel injection in an internal combustion engine that burns air-fuel mixture in a combustion chamber, the apparatus comprising:

a fuel injection valve for injecting fuel to supply the fuel into the combustion chamber;

an intake passage connected to the combustion chamber for supplying air to the combustion chamber;

a circulation passage connected to the intake passage for supplying exhaust gas, which has been discharged from the combustion chamber, to the intake passage;

a circulation valve located in the circulation passage, wherein the circulation valve controls the opening amount of the circulation passage to adjust the flow rate of the exhaust gas supplied to the intake passage from the circulation passage;

an air regulator for adjusting the flow rate of air supplied to the combustion chamber from the intake passage;

a first detector for detecting the operation state of the air regulator, wherein the operation state of the air regulator serves as a first variable;

a second detector for detecting the pressure in the intake passage, which serves as a second variable;

a third detector for detecting the engine speed, which serves as a third variable; and a controller for controlling the fuel injection valve, wherein the controller computes the amount of fuel to be injected from the injection valve based on the first and third variables when the flow rate of the exhaust gas supplied to the intake passage from the circulation passage is above a predetermined value, and wherein the controller computes the amount of fuel to be injected from the injection valve based on the second and third variables when the flow rate of the exhaust gas supplied to the intake passage from the circulation passage is under the predetermined value;

wherein the engine is able to perform a plurality of combustion modes, wherein the controller selects a required combustion mode from the plurality of combustion modes in accordance with the engine load and controls the injection valve according to the selected combustion mode, and wherein the flow rate of the exhaust gas supplied to the intake passage from the circulation passage is determined in accordance with the combustion mode selected by the controller;

wherein the combustion modes include stratified charge combustion, in which the air-fuel ratio varies within the combustion chamber, and homogeneous charge combustion, in which the air-fuel mixture is substantially homogeneous within the combustion chamber; and wherein the controller controls the fuel injection valve to directly inject fuel into the combustion chamber during a compression stroke of the engine for performing the stratified charge combustion, and wherein the controller controls the fuel injection valve to directly inject fuel into the combustion chamber during an intake stroke of the engine for performing the homogeneous charge combustion.

12. The apparatus according to claim 11, wherein the controller controls the circulation valve to increase the flow rate of the exhaust gas supplied to the intake passage from the circulation passage when the engine load and the engine speed are relatively low.

13. The apparatus according to claim 12, wherein the engine load is indicated by at least the value of the first variable.

14. The apparatus according to claim 13, wherein the air regulator includes an acceleration pedal, and wherein the first detector is a pedal angle sensor for detecting the depression degree of the acceleration pedal.

15. A method for controlling fuel injection in an internal combustion engine, the method comprising the steps of:

injecting fuel into a combustion chamber of the engine with an injector;

supplying air to the combustion chamber via an intake passage;

regulating the flow rate of the intake air with an air regulator;

supplying exhaust gas to the intake passage via a circulation passage;

detecting the operation state of the air regulator, wherein the operation state of the air regulator serves as a first variable;

detecting a characteristic of air in the intake passage, wherein the characteristic is indicative of the flow rate of the air in the intake passage, wherein the detected characteristic serves as a second variable;

computing an amount of fuel to be injected from the injector based on a plurality of parameters that indicate the operation state of the engine, wherein the computing step includes a step of selecting one of the first variable and the second variable to use as one of the plurality of parameters depending on the flow rate of the exhaust gas supplied to the intake passage from the circulation passage;

selecting a required combustion mode from a plurality of combustion modes that can be performed by the engine, in accordance with engine load and controlling the injector according to the selected combustion mode, said combustion modes including stratified charge combustion, in which the air-fuel ratio varies within the combustion chamber, and homogeneous charge combustion, in which the air-fuel mixture is substantially homogeneous within the combustion chamber, and wherein the injector includes a fuel injection valve for directly injecting fuel into the combustion chamber, wherein the controller controls the fuel injection valve to directly inject fuel into the combustion chamber during a compression stroke of the engine for performing the stratified charge combustion, and wherein the controller controls the fuel injection valve to directly inject fuel into the combustion chamber during an intake stroke of the engine for performing the homogeneous charge combustion.

\* \* \* \* \*